(12) United States Patent
Dillenberger et al.

(10) Patent No.: US 10,896,095 B2
(45) Date of Patent: *Jan. 19, 2021

(54) REPLAYING PROCESSING OF A RESTARTED APPLICATION

(71) Applicant: International Business Machines Corporation, Armonk, NY (US)

(72) Inventors: Donna N. Dillenberger, Yorktown Heights, NY (US); David C. Frank, Ossining, NY (US); Terri A. Menendez, Richmond, MA (US); Gary S. Puchkoff, Poughkeepsie, NY (US); Wayne E. Rhoten, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,154

(22) Filed: Oct. 24, 2019

(65) Prior Publication Data

US 2020/0057695 A1 Feb. 20, 2020

Related U.S. Application Data

(63) Continuation of application No. 15/799,758, filed on Oct. 31, 2017, now Pat. No. 10,540,233, which is a
(Continued)

(51) Int. Cl.
*G06F 11/00* (2006.01)
*G06F 11/14* (2006.01)

(52) U.S. Cl.
CPC .......... *G06F 11/1438* (2013.01); *G06F 11/14* (2013.01); *G06F 11/1471* (2013.01);
(Continued)

(58) Field of Classification Search
CPC ............. G06F 11/1471; G06F 11/1438; G06F 11/0793; G06F 11/1458; G06F 11/1469;
(Continued)

(56) References Cited

U.S. PATENT DOCUMENTS 3,736,566 A 5/1973 Anderson et al.
4,665,520 A 5/1987 Strom et al.
(Continued)

FOREIGN PATENT DOCUMENTS

CN 104641344 A 5/2015

OTHER PUBLICATIONS

Supplemental Notice of Allowance from U.S. Appl. No. 15/799,758, dated Dec. 19, 2019.
(Continued)

*Primary Examiner* — Loan L. T. Truong
(74) *Attorney, Agent, or Firm* — Zilka-Kotab, P.C.

(57) ABSTRACT

A computer-implemented method according to one embodiment includes establishing a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint; identifying a first failure of the application; and restarting the application and performing a first replay of the application in response to the first failure.

20 Claims, 11 Drawing Sheets

Related U.S. Application Data continuation of application No. 15/284,409, filed on Oct. 3, 2016, now Pat. No. 9,858,151.

(52) U.S. Cl.
CPC .... *G06F 2201/805* (2013.01); *G06F 2201/82* (2013.01); *G06F 2201/84* (2013.01)

(58) Field of Classification Search
CPC ............. G06F 16/2379; G06F 2201/82; G06F 11/3476; G06F 16/273; G06F 2201/84; G06F 11/1402
See application file for complete search history.

(56) References Cited

U.S. PATENT DOCUMENTS

| | | | |
|---|---|---|---|
| 4,852,092 A | 7/1989 | Makita | |
| 5,065,311 A | 11/1991 | Masai et al. | |
| 5,321,698 A | 6/1994 | Nguyen et al. | |
| 5,465,328 A | 11/1995 | Dievendorff et al. | |
| 5,495,590 A | 2/1996 | Comfort et al. | |
| 5,590,277 A | 12/1996 | Fuchs et al. | |
| 5,630,047 A | 5/1997 | Wang | |
| 5,787,243 A | 7/1998 | Stiffler | |
| 5,907,673 A | 5/1999 | Hirayarna et al. | |
| 6,031,991 A | 2/2000 | Hirayarna | |
| 6,101,524 A * | 8/2000 | Choi | G06F 9/52 710/264 |
| 6,247,118 B1 | 6/2001 | Zumkehr et al. | |
| 6,584,581 B1 | 6/2003 | Bay et al. | |
| 7,039,663 B1 * | 5/2006 | Federwisch | G06F 11/1451 |
| 7,305,421 B2 * | 12/2007 | Cha | G06F 11/1471 |
| 7,526,676 B2 | 4/2009 | Chou et al. | |
| 7,533,296 B2 | 5/2009 | Vertes | |
| 7,571,343 B1 | 8/2009 | Xiang et al. | |
| 7,580,760 B2 * | 8/2009 | Allman | G06Q 40/00 700/73 |
| 7,627,728 B1 | 12/2009 | Roeck et al. | |
| 7,650,606 B2 | 1/2010 | Ahuja et al. | |
| 7,792,983 B2 * | 9/2010 | Mishra | G06F 9/544 709/231 |
| 7,895,474 B2 | 2/2011 | Collins et al. | |
| 7,992,148 B2 | 8/2011 | Collins et al. | |
| 8,090,996 B2 | 1/2012 | Vera et al. | |
| 8,683,262 B1 * | 3/2014 | Subbiah | G06F 16/90 714/16 |
| 8,868,622 B2 * | 10/2014 | Chellam | G06F 9/5077 707/812 |
| 8,949,801 B2 * | 2/2015 | Andrade | G06F 11/1438 714/1 |
| 9,208,032 B1 | 12/2015 | McAlister et al. | |
| 9,223,823 B2 | 12/2015 | Mitchell et al. | |
| 9,280,591 B1 | 3/2016 | Kharatishvili et al. | |
| 9,298,538 B2 | 3/2016 | Marvasti et al. | |
| 9,519,664 B1 | 12/2016 | Kharatishvili et al. | |
| 9,606,820 B2 * | 3/2017 | Daudel | G06F 9/45533 |
| 9,858,151 B1 | 1/2018 | Dillenberger et al. | |
| 9,886,363 B2 * | 2/2018 | Chambliss | G06F 11/3414 |
| 9,928,071 B1 * | 3/2018 | Tene | G06F 9/3834 |
| 10,534,675 B2 * | 1/2020 | Kedia | G06F 16/273 |
| 10,540,233 B2 | 1/2020 | Dillenberger et al. | |
| 10,552,413 B2 * | 2/2020 | Lee | G06F 16/24532 |
| 10,635,644 B2 * | 4/2020 | Theimer | G06F 9/5066 |
| 2001/0042224 A1 | 11/2001 | Stanfill et al. | |
| 2004/0163082 A1 * | 8/2004 | Tremblay | G06F 9/30087 718/101 |
| 2004/0187115 A1 * | 9/2004 | Tremblay | G06F 9/3834 718/100 |
| 2004/0215998 A1 | 10/2004 | Buxton et al. | |
| 2004/0267809 A1 | 12/2004 | East et al. | |
| 2005/0262411 A1 * | 11/2005 | Vertes | G06F 11/2041 714/741 |
| 2006/0041786 A1 * | 2/2006 | Janakiraman | G06F 9/468 714/13 |
| 2006/0167955 A1 | 7/2006 | Vertes | |
| 2006/0179147 A1 | 8/2006 | Tran et al. | |
| 2006/0200507 A1 * | 9/2006 | Holenstein | G06F 11/2048 |
| 2007/0022146 A1 | 1/2007 | Murley et al. | |
| 2007/0088970 A1 | 4/2007 | Buxton et al. | |
| 2007/0208744 A1 | 9/2007 | Krishnaprasad et al. | |
| 2007/0214340 A1 * | 9/2007 | Leveille | G06F 9/52 711/203 |
| 2007/0244937 A1 | 10/2007 | Flynn et al. | |
| 2007/0244962 A1 * | 10/2007 | Laadan | H04L 69/40 709/201 |
| 2007/0260908 A1 | 11/2007 | Mitchell et al. | |
| 2007/0277056 A1 | 11/2007 | Varadarajan et al. | |
| 2008/0046696 A1 | 2/2008 | Vertes | |
| 2008/0086730 A1 | 4/2008 | Vertes | |
| 2008/0281865 A1 | 11/2008 | Price et al. | |
| 2009/0037910 A1 | 2/2009 | Dantzig et al. | |
| 2009/0119549 A1 * | 5/2009 | Vertes | G06F 11/3414 714/47.1 |
| 2009/0133033 A1 * | 5/2009 | Lindo | G06F 11/3624 718/108 |
| 2009/0222596 A1 | 9/2009 | Flynn et al. | |
| 2010/0161549 A1 | 6/2010 | Plancarte et al. | |
| 2010/0251031 A1 * | 9/2010 | Nieh | G06F 11/3476 714/45 |
| 2010/0287535 A1 * | 11/2010 | Kim | G06F 11/3688 717/127 |
| 2011/0296241 A1 | 12/2011 | Elnozahy | |
| 2011/0296245 A1 | 12/2011 | Alberi et al. | |
| 2012/0079174 A1 | 3/2012 | Nellans et al. | |
| 2012/0117421 A1 | 5/2012 | Craft et al. | |
| 2012/0166869 A1 | 6/2012 | Young et al. | |
| 2012/0185430 A1 * | 7/2012 | Yao | G06F 11/3414 707/617 |
| 2012/0204060 A1 | 8/2012 | Swift et al. | |
| 2012/0303576 A1 | 11/2012 | Calder et al. | |
| 2012/0303581 A1 | 11/2012 | Calder et al. | |
| 2013/0042156 A1 | 2/2013 | Srinivasan et al. | |
| 2013/0117236 A1 * | 5/2013 | Schreter | G06F 16/2308 707/682 |
| 2014/0089642 A1 * | 3/2014 | Gottschlich | G06F 9/3851 712/220 |
| 2014/0172803 A1 | 6/2014 | Diaconu et al. | |
| 2014/0194211 A1 | 7/2014 | Chimes et al. | |
| 2014/0237293 A1 * | 8/2014 | Cui | G06F 11/3414 714/37 |
| 2014/0280441 A1 | 9/2014 | Jacobson et al. | |
| 2014/0324785 A1 | 10/2014 | Gupta et al. | |
| 2014/0379955 A1 * | 12/2014 | Dong | G06F 11/1484 711/6 |
| 2015/0006487 A1 | 1/2015 | Yang et al. | |
| 2015/0019909 A1 | 1/2015 | Griffith et al. | |
| 2015/0032877 A1 | 1/2015 | Li | |
| 2015/0358417 A1 | 12/2015 | Patil et al. | |
| 2016/0364440 A1 * | 12/2016 | Lee | G06F 11/14 |
| 2017/0091056 A1 | 3/2017 | Watanabe et al. | |
| 2017/0131911 A1 * | 5/2017 | Veeraraghavan | G06F 3/0683 |
| 2017/0132071 A1 * | 5/2017 | Bradshaw | G06F 11/079 |
| 2017/0177658 A1 * | 6/2017 | Lee | G06F 11/1451 |
| 2017/0277726 A1 | 9/2017 | Huang et al. | |
| 2017/0322972 A1 * | 11/2017 | Lee | G06F 16/137 |
| 2018/0095830 A1 | 4/2018 | Dillenberger et al. | |

OTHER PUBLICATIONS

List of IBM Patents or Patent Applications Treated as Related.

Tannebaum, T. et al.; "The Condor distributed processing system"; Dr. Dobb's Journal, vol. 20, No. 2, pp. 40, 42-44, 47-48, 102.; Feb. 1995.

Anonymous, "Method or Technique to Abstract a Batch Computing Application Flow as a Reusable Model," IP.com Prior Art Database Technical Disclosure, 2012, pp. 1-3.

Internet Society RFCS et al., "Proposed Remote Job Entry Protocol," IP.com Prior Art Database Technical Disclosure, 2010, pp. 1-37.

Dillenberger et al., U.S. Appl. No. 15/284,409, filed Oct. 3, 2016.

(56) References Cited

OTHER PUBLICATIONS

Non-Final Office Action from U.S. Appl. No. 15/284,409, dated Feb. 10, 2017.
Notice of Allowance from U.S. Appl. No. 15/284,409, dated Aug. 28, 2017.
Dillenberger et al., U.S. Appl. No. 15/799,758, filed Oct. 31, 2017.
Non-Final Office Action from U.S. Appl. No. 15/799,758, dated May 16, 2019.
Notice of Allowance from U.S. Appl. No. 15/799,758, dated Sep. 11, 2019.
Office Action from Chinese Patent Application No. 201710909616.4, dated Jun. 10, 2020.

\* cited by examiner

REPLAYING PROCESSING OF A RESTARTED APPLICATION

BACKGROUND

The present invention relates to running an application on a shared data set, and more specifically, this invention relates to enabling a replay of a failed application on the shared data set.

Running applications on shared data sets is an important means of maintaining the shared data sets and obtaining information on the shared data sets. However, one problem of sharing portions of a data set between an application and other online applications is the ability to restart and replay an application if it should fail.

SUMMARY

A computer-implemented method according to one embodiment includes establishing a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint; identifying a first failure of the application; and restarting the application and performing a first replay of the application in response to the first failure, including identifying a first plurality of data reads from the restarted application that occur before the predetermined checkpoint, returning the duplicate read data to the restarted application, in response to the first plurality of data reads, identifying a first plurality of data writes from the application, where the first plurality of data writes include writes made by the application before the predetermined checkpoint, discarding the first plurality of data writes by writing the first plurality of data writes to a null device, identifying a second plurality of data reads from the restarted application that occur after the predetermined checkpoint but before the first failure of the application, where the second plurality of data reads have been undone after the first failure of the application, retrieving data from the at least one data set in response to the second plurality of data reads, returning the data from the at least one data set to the restarted application, in response to the second plurality of data reads, identifying a second plurality of data writes from the restarted application, where the second plurality of data writes are associated with the data from the at least one data set, and writing the second plurality of data writes to the at least one data set.

According to another embodiment, a computer program product for enabling a replay of a processing of at least one data set by a restarted application comprises a computer readable storage medium having program instructions embodied therewith, wherein the computer readable storage medium is not a transitory signal per se, and where the program instructions are executable by a processor to cause the processor to perform a method including establishing, by the processor, a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint; identifying, by the processor, a first failure of the application; and restarting, by the processor, the application and performing a first replay of the application in response to the first failure, including identifying, by the processor, a first plurality of data reads from the restarted application that occur before the predetermined checkpoint, returning, by the processor, the duplicate read data to the restarted application, in response to the first plurality of data reads, identifying, by the processor, a first plurality of data writes from the application, where the first plurality of data writes include writes made by the application before the predetermined checkpoint, discarding, by the processor, the first plurality of data writes by writing the first plurality of data writes to a null device, identifying, by the processor, a second plurality of data reads from the restarted application that occur after the predetermined checkpoint but before the first failure of the application, where the second plurality of data reads have been undone after the first failure of the application, retrieving, by the processor, data from the at least one data set in response to the second plurality of data reads, returning, by the processor, the data from the at least one data set to the restarted application, in response to the second plurality of data reads, identifying, by the processor, a second plurality of data writes from the restarted application, where the second plurality of data writes are associated with the data from the at least one data set, and writing, by the processor, the second plurality of data writes to the at least one data set.

A system according to another embodiment includes a processor, and logic integrated with the processor, executable by the processor, or integrated with and executable by the processor, the logic being configured to establish a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint; identify a first failure of the application; and restart the application and performing a first replay of the application in response to the first failure, including: identify a first plurality of data reads from the restarted application that occur before the predetermined checkpoint, return the duplicate read data to the restarted application, in response to the first plurality of data reads, identify a first plurality of data writes from the application, where the first plurality of data writes include writes made by the application before the predetermined checkpoint, discard the first plurality of data writes by writing the first plurality of data writes to a null device, identify a second plurality of data reads from the restarted application that occur after the predetermined checkpoint but before the first failure of the application, where the second plurality of data reads have been undone after the first failure of the application, retrieve data from the at least one data set in response to the second plurality of data reads, return the data from the at least one data set to the restarted application, in response to the second plurality of data reads, identify a second plurality of data writes from the restarted application, where the second plurality of data writes are associated with the data from the at least one data set, and write the second plurality of data writes to the at least one data set.

Other aspects and embodiments of the present invention will become apparent from the following detailed description, which, when taken in conjunction with the drawings, illustrate by way of example the principles of the invention.

DETAILED DESCRIPTION

Figure 1:
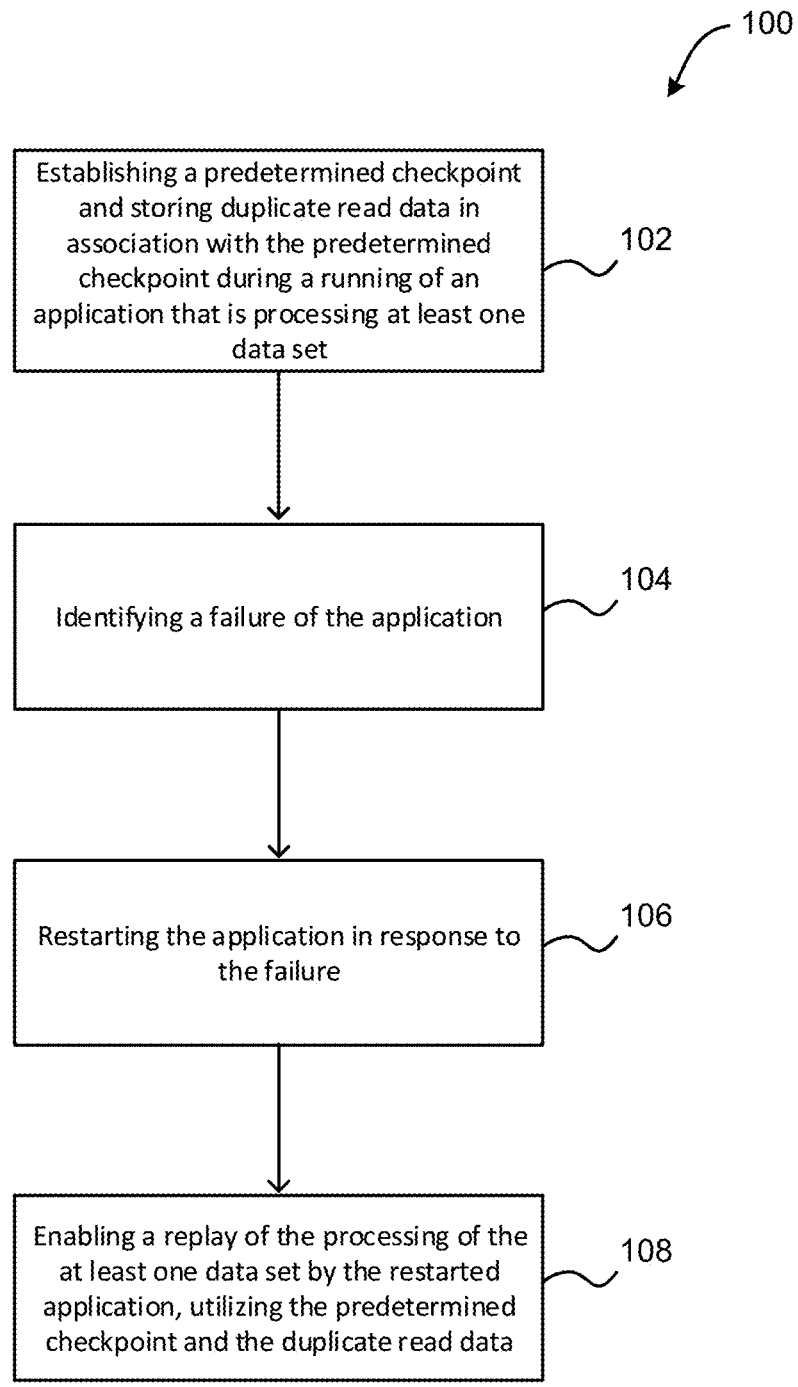
FIG. 1 illustrates a method for replaying processing of a restarted application, in accordance with one embodiment.

The following description discloses several preferred embodiments of systems, methods and computer program products for replaying processing of a restarted application. Various embodiments provide a method to restart a failed application and allow the restarted application to safely process shared data within a system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for replaying processing of a restarted application.

In one general embodiment, a computer-implemented method includes restarting an application at a second system in response to a failure of the application at a first system, receiving replicated logged data from the first system at the second system, updating a second data set at the second system to reflect a first data set at the first system, utilizing the replicated logged data, identifying a first plurality of data reads from the restarted application at the second system, where the first plurality of data reads occur before a predetermined checkpoint, and in response to the first plurality of data reads, retrieving the replicated logged data from the second system, and returning the replicated logged data to the restarted application at the second system.

In another general embodiment, a computer program product for enabling a replay of a processing of at least one data set by a restarted application comprises a computer readable storage medium having program instructions embodied therewith, wherein the computer readable storage medium is not a transitory signal per se, and where the program instructions are executable by a processor to cause the processor to perform a method comprising restarting, utilizing the processor, an application at a second system in response to a failure of the application at a first system, receiving, utilizing the processor, replicated logged data from the first system at the second system, updating, utilizing the processor, a second data set at the second system to reflect a first data set at the first system, utilizing the replicated logged data, identifying, utilizing the processor, a first plurality of data reads from the restarted application at the second system, where the first plurality of data reads occur before a predetermined checkpoint, and in response to the first plurality of data reads, retrieving, utilizing the processor, the replicated logged data from the second system, and returning the replicated logged data to the restarted application at the second system.

In another general embodiment, a system includes a processor, and logic integrated with the processor, executable by the processor, or integrated with and executable by the processor, the logic being configured to restart an application at a second system in response to a failure of the application at a first system, receive replicated logged data from the first system at the second system, update a second data set at the second system to reflect a first data set at the first system, utilizing the replicated logged data, identify a first plurality of data reads from the restarted application at the second system, where the first plurality of data reads occur before a predetermined checkpoint, and in response to the first plurality of data reads, retrieve the replicated logged data from the second system, and returning the replicated logged data to the restarted application at the second system.

Now referring to FIG. 1, a flowchart of a method 100 is shown according to one embodiment. The method 100 may be performed in accordance with the present invention in any of the environments depicted in FIGS. 2 and 9-11, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1, method 100 may initiate with operation 102, where a predetermined checkpoint is established, and duplicate read data is stored in association with the predetermined checkpoint, during a running of an application that is processing at least one data set. For example, the predetermined checkpoint may indicate a stage in the processing of the at least one data set by the application before the failure of the application where changes made by the application have been committed by the at least one data set.

Additionally, as shown in FIG. 1, method 100 may proceed with operation 104, where a failure of an application is identified, where the application is processing at least one data set. In one embodiment, the application may include a batch job. For example, the application may include a plurality of actions being performed on the at least one data set (e.g., reads from the at least one data set, manipulation of read data, writes of manipulated data back to the at least one data set, etc.). In another example, the application may be running on a predetermined partition of a system. In another embodiment, the at least one data set may include one or more corpuses of stored data. For example, the at least one data set may include data stored in one or more tables, data stored in one or more databases, etc. In another example, the data set may include data maintained generally as sets of records by one or more of an operating system and one or more applications.

Additionally, in one embodiment, the at least one data set may be shared. For example, the at least one data set may be shared with one or more additional applications other than the application that is processing the at least one data set (e.g. one or more online applications, etc.). In another embodiment, the system in which the at least one data set is processed may include one or more computing devices, one or more servers, one or more cloud-based devices, etc. In yet another embodiment, the failure of the application may include an interruption of the processing of the at least one data set by the application. For example, the application may fail due to a power outage, a network interruption, the application crashing, etc.

Further, as shown in FIG. 1, method 100 may proceed with operation 106, where the application is restarted in response to the failure. In one embodiment, the application may be restarted within the same partition in which the application had previously been running. In another embodiment, the application may be restarted within a different partition from which the application had previously been running. In yet another embodiment, the application may be restarted within the same or different system in which the application had previously been running. In still another embodiment, restarting the application may include starting the application at the beginning of its processing (e.g., the processing of the at least one data set, etc.).

In addition, as shown in FIG. 1, method 100 may proceed with operation 108, where a replay of the processing of the restarted application is enabled. In one embodiment, enabling the replay of the processing of the application may include enabling the restarted application to process the at least one data set at the restart point without altering the application and/or the at least one data set.

Also, in one embodiment, enabling the replay of the processing of the restarted application may include identifying a first plurality of data reads from the restarted application that occur before the predetermined checkpoint. In another example, the predetermined checkpoint may include one of a plurality of commit points.

In addition, in one embodiment, enabling the replay of the processing of the restarted application may include retrieving the duplicate read data, and returning the duplicate read data to the restarted application, in response to the first plurality of data reads. For example, the duplicate read data may be logged to create logged data and may include an image of data read from the at least one data set before the failure of the application that is stored in a log (e.g., in response to data reads made by the application before the failure of the application). In another example, an image of all data retrieved by the application before the predetermined checkpoint may be stored within the log to create the duplicate read data.

Furthermore, in one embodiment, enabling the replay of the processing of the restarted application may include identifying a first plurality of data writes from the application, where the first plurality of data writes are associated with the duplicate read data. For example, first plurality of data writes may match writes made by the application before the predetermined checkpoint/failure of the application.

Further still, in one embodiment, enabling the replay of the processing of the restarted application may include discarding the first plurality of data writes. For example, the first plurality of data writes may be discarded by being written to a null device. In another example, the first plurality of data writes may match writes that are already recorded/committed in the at least one data set before the failure of the application. In this way, a correct data set may be maintained while maintaining the logic of the application.

Also, in one embodiment, enabling the replay of the processing of the restarted application may include identifying a second plurality of data reads from the restarted application that occur after a predetermined checkpoint. For example, the second plurality of data reads may match reads that were not made prior to the predetermined checkpoint before the failure of the application. In another example, the second plurality of data reads may have been undone after the failure of the application.

Additionally, in one embodiment, enabling the replay of the processing of the restarted application may include retrieving data set data, and returning the data set data to the restarted application, in response to the second plurality of data reads. For example, the data set data may include current data that is read from the at least one data set after the failure of the application.

Further, in one embodiment, enabling the replay of the processing of the restarted application may include identifying a second plurality of data writes from the restarted application, where the second plurality of data writes are associated with the data set data. For example, the second plurality of data writes may not have been made by the application before the predetermined checkpoint/failure of the application. In another embodiment, enabling the replay of the processing of the restarted application may include writing the second plurality of data writes to the at least one data set.

In this way, the restarted application may replay processing of the at least one data set that occurred before a predetermined checkpoint, and may continue processing of the at least one data set that occurred after the predetermined checkpoint, without having to change code of the restarted application. Additionally, by replaying the processing of the restarted application instead of discarding updated data sets, making new copies, and restarting the application, time and resources may be saved.

Further still, in one embodiment, a second failure of the application may be identified. For example, the restarted application may fail when processing the at least one data set. In another embodiment, the application may be restarted in response to the second failure, and a second replay of the processing of the restarted application may be enabled. In yet another embodiment, the second failure of the application may result in stale read data within the log, and the stale read data may be skipped over within the log during the second replay (e.g., utilizing a filter, etc.).

Also, in one embodiment, microbatching logic may be interposed between the application and lower level input/output (I/O) operations (e.g., open, close, read, write, etc.). In another embodiment, the microbatching may be transparent to the application. In case of errors, recovery data may be used to undo the last microbatch that was not committed. In another embodiment, each microbatch may include a separate transaction.

Further, in one embodiment, the application may hold a lock on a portion of the at least one data set during the processing of the portion of the at least one data set. For example, the application may hold a lock on a portion of the at least one data set that the application is currently processing (e.g. reading, updating, and writing, etc.), and once the processing of the portion of the at least one data set is committed (e.g., once updated data has been written to the at least one data set by the application for that portion, etc.), the predetermined checkpoint may be set, and the lock to that portion of the at least one data set may be released.

In another embodiment, during the processing of the portion of the at least one data set, an image of all data retrieved from the at least one data set by the application during the processing may be saved in a log. For example, an image may be created of all data returned by the at least one data set in response to reads made by the application during the processing, and the image data may be stored in the log. In another example, the application may submit a read request, the at least one data set may return data in response to the read request, an image of the returned data may be written to the log (in addition to run and commit records), and the data returned by the at least one data set may be sent to the application. The application may then process/update the data and send a write request, such that the processed data is written to the at least one data set.

Additionally, in one embodiment, the application may include a batch job in an environment where the at least one data set is shared with other users (e.g., via an online environment, etc.). For example, the batch job may be changed to open files for shared access (e.g., VSAM record level sharing, etc.). In another example, the batch job may invoke before image logging and may provide periodic commit points via a transactional resource manager (e.g., transaction VSAM auto commits, etc.). In yet another example, the batch job may invoke backouts explicitly or implicitly through automatic backout methods (e.g., transactional VSAM, etc.). In still another example, the batch job may restart at a specified step level.

Further, in one embodiment, the batch job may perform an initial run. For example, during the initial run, the batch job may retain system logging of commit points, log a before image of input records for shared data sets, and may lock non-shared input files from update access. In yet another embodiment, if the batch job fails, a transactional resource manager may back out updated to the last commit point. An operator may then resubmit the batch job beginning at the appropriate step level.

Further still, in one embodiment, when the batch job is restarted after failure, the batch job may be run in a replay mode after a run ID has been incremented. In another embodiment, the back out log may be read backwards to find a last commit point. Update processing by the batch job may be skipped in the replay mode until the last commit point is in process, and then processing of updates may be resumed. Input data sets may be read from the back out log until the last commit point is reached, which may allow for the same input data to be processed when the job is replayed.

Also, in one embodiment, if the batch job completes successfully, non-shared input files may be unlocked, and undo logs may be updated with successful end of step records. In this way, no code changes may be required by the batch job, the batch job may be restarted on any system with access to the at least one data set, and the input records may be protected until such time as the batch job may be restarted.

In this way, one or more shared data sets which may be updated by other users, but read by a replayable batch job (e.g., VSAM RLS data sets, etc.), may log records read, where the log may be used to reread the records during a replay. Further, one or more read only non-shared data sets may be locked (e.g., at the data set level) for update access when a replayable job first starts (e.g., before a failure, etc.), and other users may continue to read the one or more data sets. Once the job is successfully replayed, the one or more non-shared data sets may be unlocked. Updated non-shared data sets may be restored from a backup copy taken at the beginning of the step.

Figure 2:
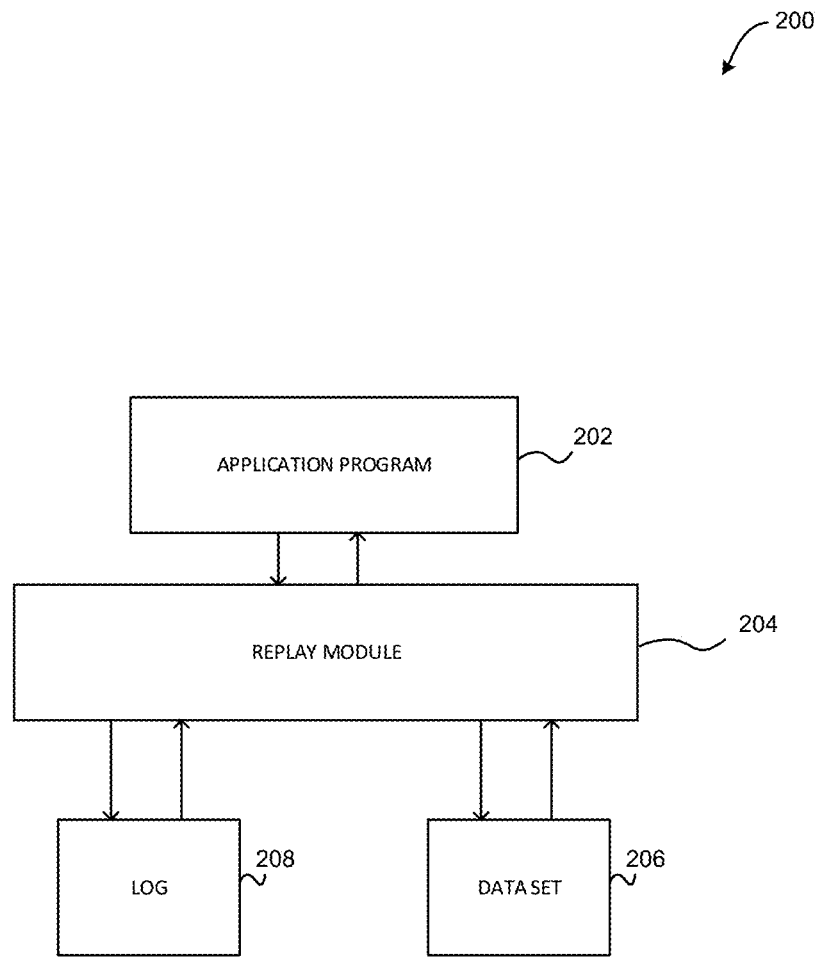
FIG. 2 illustrates an exemplary application processing environment, in accordance with one embodiment.

FIG. 2 illustrates an exemplary application processing environment 200, according to one embodiment. As shown, the application processing environment 200 includes an application program 202 in communication with a replay module 204. Additionally, the replay module 204 is in communication with a data set 206 and a log 208. In one embodiment, the application program 202 may include a batch processing job that is to be applied to the data set 206.

Further, in one embodiment, the replay module 204 may include functionality that enables the application program to be replayed in association with the data set 206. For example, the replay module 204 may include an input/output (I/O) interface to communicate with the data set 206, as well as a logging module to log data to the log 208.

Further still, in one embodiment, the application program 202 may hold a lock on a portion of the data set 206 when the application program is updating the portion. In another embodiment, while the lock is being held, the application program 202 may send a plurality of read requests to the replay module 204, where the read requests include requests to read data from the locked portion of the data set 206. The replay module 204 may in turn request the data from the data set 206, which may return the data to the replay module 204 in response to the requests.

Also, in one embodiment, the replay module 204 may log the returned data in the log 208 and may return the data to the application program 202. The application program 202 may then update the data to create updated data, and may return the updated data to the replay module 204 using write requests, where the replay module 204 may then send the updated data back to the data set 206 for storage.

In addition, in one embodiment, once the application program 202 has updated a predetermined amount of data from the locked portion of the data set 206, all the updated data may be committed (e.g., written to the data set 206) and a checkpoint may be noted. In another embodiment, after the checkpoint has been noted, the application program 202 may fail. In response to the failure, the application program 202 may be restarted, such that the application program 202 restarts all updating of the portion of the data set.

Furthermore, in one embodiment, the restarted application program may resend the plurality of read requests to the replay module 204. The replay module 204 may identify the plurality of resent read requests as occurring before the checkpoint, and in response, the replay module 204 may retrieve the requested data from the log 208 instead of from the data set 206. The replay module may then return the data to the replay module 204 in response to the resent requests.

Further still, in one embodiment, the application program 202 may then update the data as before to create updated data, and may return the updated data to the replay module 204 via resent write requests. The replay module 204 may determine that the resent write requests occurred before the checkpoint, and may then discard the updated data instead of sending the updated data back to the data set 206 for storage (since the updated data is already stored in the data set 206).

Also, in one embodiment, the restarted application program may resend additional read requests to the replay module 204. The replay module 204 may identify the additional read requests as occurring after the checkpoint, and in response, the replay module 204 may retrieve the requested additional data from the data set 206. The replay module may then return the data to the replay module 204 in response to the additional read requests.

Additionally, in one embodiment, the application program 202 may then update the additional data to create additional updated data, and may return the additional updated data to the replay module 204 via additional write requests. The replay module 204 may determine that the additional write requests occurred after the checkpoint, and may then send the additional updated data back to the data set 206 for storage.

Further, in one embodiment, once the application program has updated all desired data from the locked portion of the data set 206, the lock on the portion may be released and another lock may be obtained/held for another portion of the data set 206.

Figure 3:
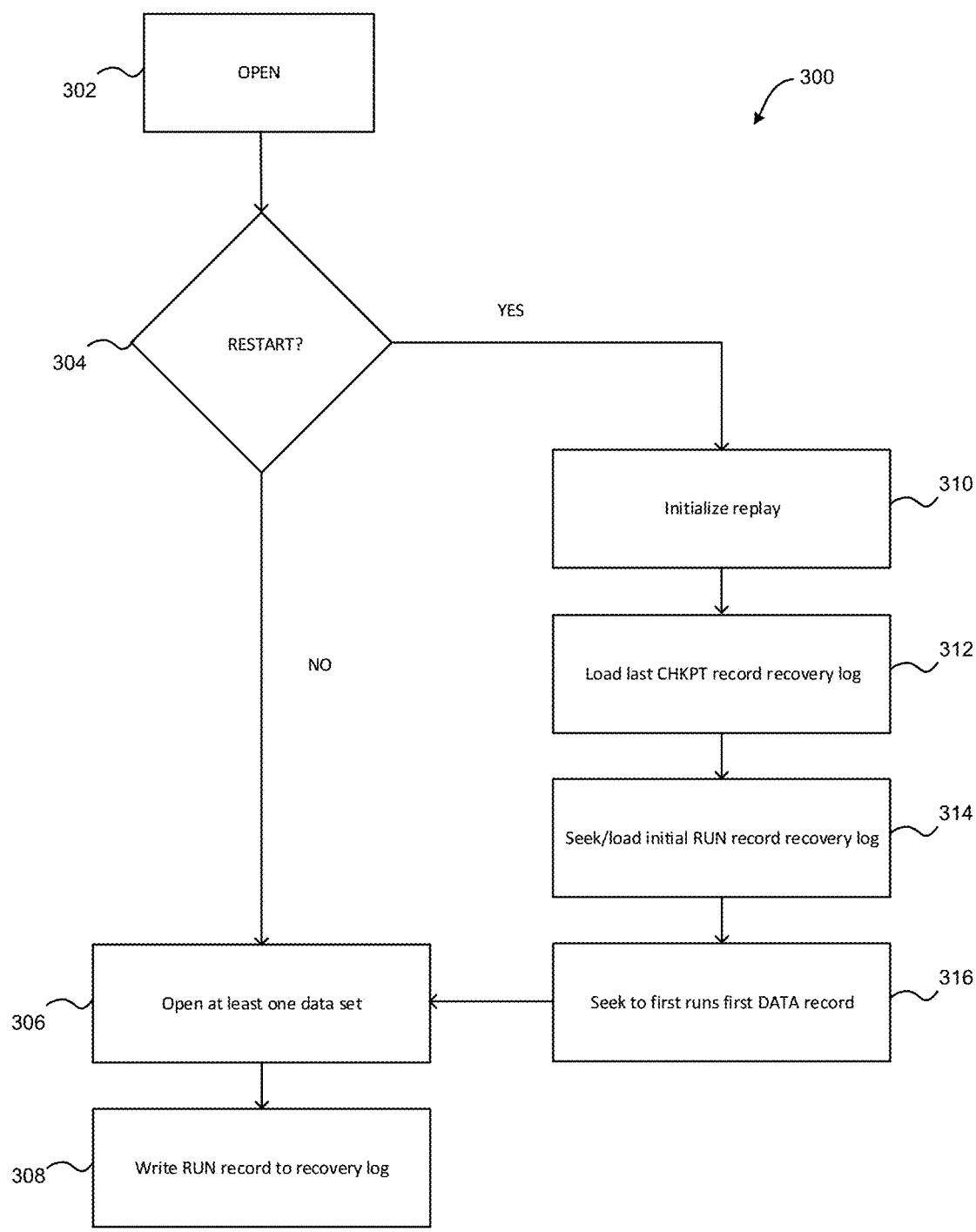
FIG. 3 illustrates a method for implementing an opening of at least one data set, in accordance with one embodiment.

Now referring to FIG. 3, a flowchart of a method 300 for implementing an opening of at least one data set is shown according to one embodiment. The method 300 may be performed in accordance with the present invention in any of the environments depicted in FIGS. 2 and 9-11, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an open command is received. Additionally, method 300 may proceed with decision 304, where it is determined whether a restart is being performed. If it is determined in decision 304 that a restart is not being performed, then method 300 may proceed with operation 306, where at least one data set is opened, and method 300 may proceed with operation 308, where a RUN record is written to a recovery log.

If it is determined in decision 304 that a restart is being performed, then method 300 may proceed with operation 310, where a replay is initialized. Additionally, method 300 may proceed with operation 312, where a last checkpoint record recovery log is loaded, and method 300 may proceed with operation 314, where an initial RUN record recovery log is identified and loaded. Further, method 300 may proceed with operation 316, where a seek to first runs a first data record, and method 300 may proceed with operation 306, where the at least one data set is opened, and operation 308, where the RUN record is written to the recovery log.

Figure 4:
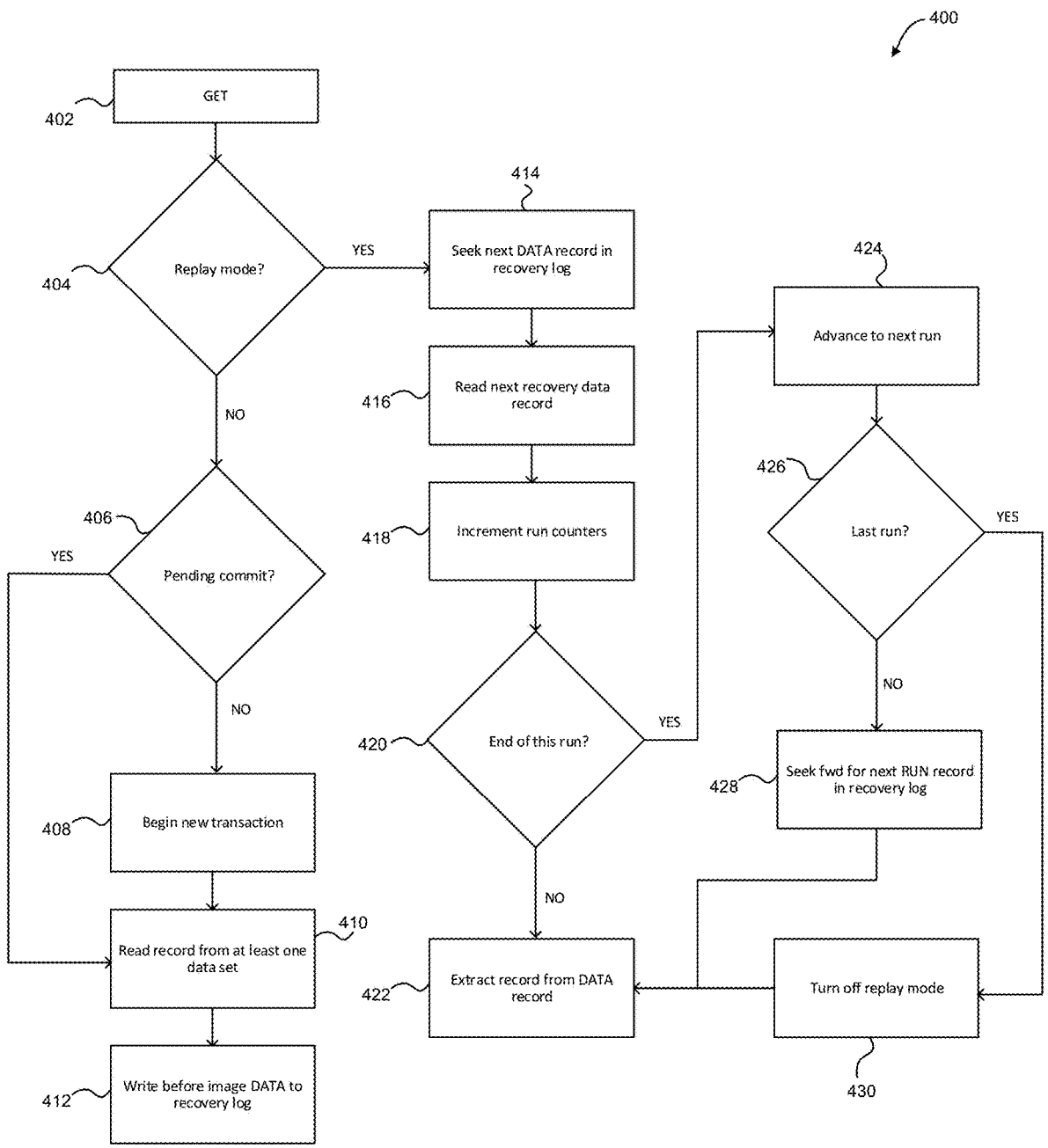
FIG. 4 illustrates a method for getting a record, in accordance with one embodiment.

Now referring to FIG. 4, a flowchart of a method 400 for getting a record is shown according to one embodiment. The method 400 may be performed in accordance with the present invention in any of the environments depicted in FIGS. 2 and 9-11, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a GET command is received. The method 400 may proceed with decision 404, where it is determined whether a replay mode is being implemented. If it is determined in decision 404 that a replay mode is not being implemented, method 400 may proceed with decision 406, where it may be determined whether a pending commit exists. If it is determined in decision 406 that a pending commit does not exist, then method 400 may proceed with operation 408, where a new transaction is begun, as well as operation 410, where the requested record is read from the at least one data set, and also operation 412, where image data is written to a recovery log. If it is determined in decision 406 that a pending commit does exist, then method 400 may proceed with operation 410, where the requested record is read from the at least one data set, and also operation 412, where image data is written to a recovery log.

Additionally, if it is determined in decision 404 that a replay mode is being implemented, method 400 may proceed with operation 414, where the next data record is sought in the recovery log. Further, method 400 may proceed with operation 416, where the next recovery data record is read, method 400 may proceed with operation 418, where run counters are incremented. Further still, it is determined in decision 420 whether the run has ended. If it is determined in decision 420 that the run has not ended, then method 400 may proceed with operation 422, where a record is extracted from a DATA record.

Also, if it is determined in decision 420 that the run has ended, then method 400 may proceed with operation 424, where the next run is advanced to. It is also determined in decision 426 whether the next run is the last run. If it is determined in decision 426 that the next run is not the last run, then method 400 may proceed with operation 428, where the next RUN record is sought in the recovery log, and method 400 may proceed with operation 422, where a record is extracted from a DATA record. If it is determined in decision 426 that the next run is the last run, then method 400 may proceed with operation 430, where replay mode is turned off, and method 400 may proceed with operation 422, where a record is extracted from a DATA record.

Figure 5:
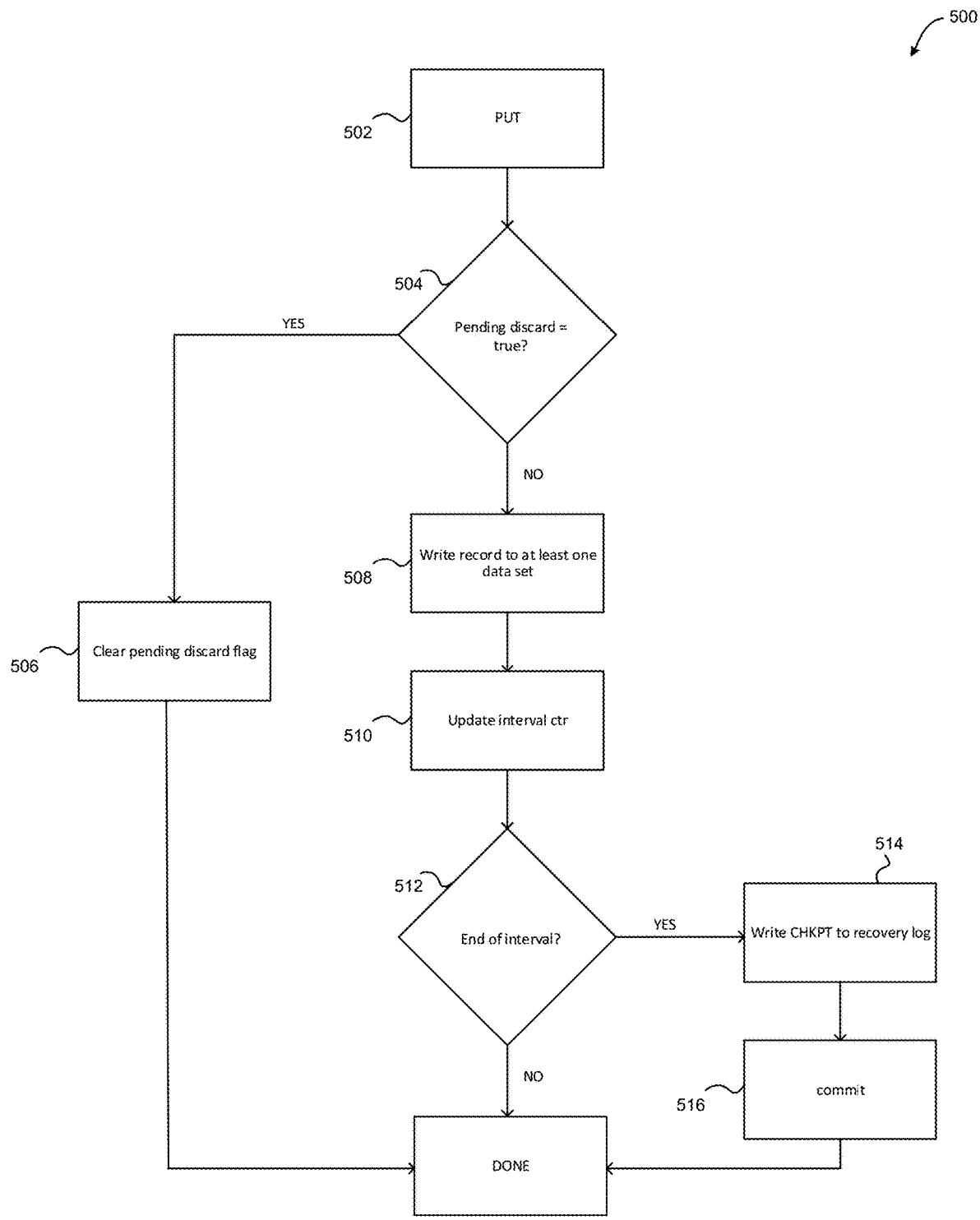
FIG. 5 illustrates a method for putting a record, in accordance with one embodiment.

Now referring to FIG. 5, a flowchart of a method 500 for putting a record is shown according to one embodiment. The method 500 may be performed in accordance with the present invention in any of the environments depicted in FIGS. 2 and 9-11, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a PUT command is received. The method 500 may initiate with decision 504, where it is determined whether a pending discard flag is enabled. If it is determined in decision 504 that a pending discard flag is enabled, then method 500 may proceed with operation 506, where the pending discard flag is cleared. If it is determined in decision 504 that a pending discard flag is not enabled, then method 500 may proceed with operation 508, where the record is written to the at least one data set, and method 500 may proceed with operation 510, where the interval counter is updated.

Additionally, method 500 may proceed with decision 512, where it is determined whether the interval has ended. If it is determined in decision 512 that the interval has ended, then the method is finished. If it is determined in decision 512 that the interval has not ended, method 500 may proceed with operation 514, where a checkpoint is written to a recovery log, and method 500 may proceed with operation 516, where a commit is performed.

Figure 6:
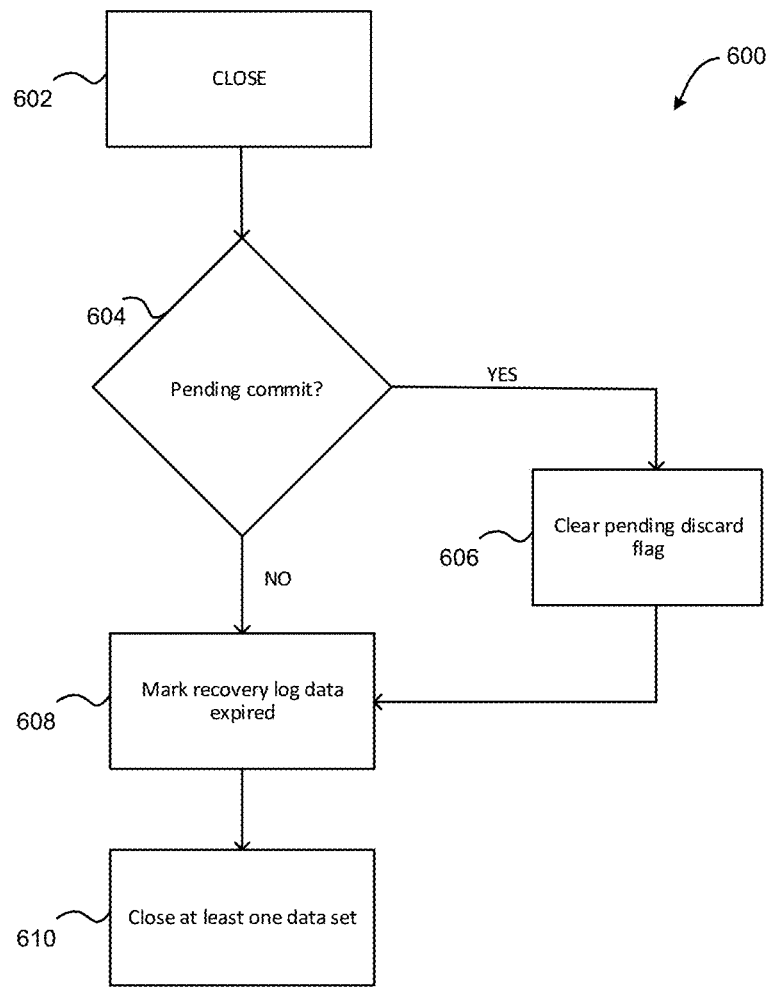
FIG. 6 illustrates a method for closing at least one data set, in accordance with one embodiment.

Now referring to FIG. 6, a flowchart of a method 600 for closing at least one data set is shown according to one embodiment. The method 600 may be performed in accordance with the present invention in any of the environments depicted in FIGS. 2 and 9-11, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a close command is received. Additionally, method 600 may proceed with decision 604, where in response to a request to open the at least one data set, it is determined whether a pending commit exists. If it is determined in decision 604 that a pending commit exists, then method 600 may proceed with operation 606, where the interval is committed, and method 600 may proceed with operation 608, where the recovery log data is marked as expired. If it is determined in decision 604 that a pending commit does not exists, then method 600 may proceed with operation 608, where the recovery log data is marked as expired. Additionally, method 600 may proceed with operation 610, where the at least one data set is closed.

Figure 7:
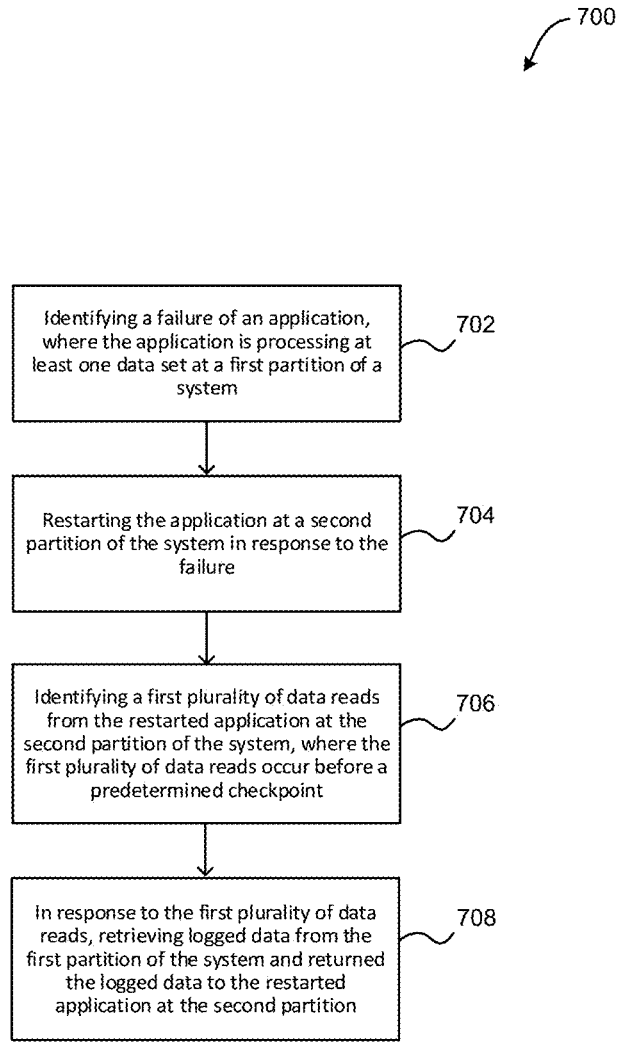
FIG. 7 illustrates a method for restarting an application in a separate partition, in accordance with one embodiment.

Now referring to FIG. 7, a flowchart of a method 700 for restarting an application in a separate partition is shown according to one embodiment. The method 700 may be performed in accordance with the present invention in any of the environments depicted in FIGS. 2 and 9-11, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a failure of an application is identified, where the application is processing at least one data set at a first partition of a system. Additionally, method 700 may proceed with operation 704, where the application is restarted at a second partition of the system in response to the failure. Further, method 700 may proceed with operation 706, where a first plurality of data reads are identified from the restarted application at the second partition of the system, where the first plurality of data reads occur before a predetermined checkpoint. Further still, method 700 may proceed with operation 708, where in response to the first plurality of data reads, logged data is retrieved from the first partition of the system and returned to the restarted application at the second partition.

Figure 8:
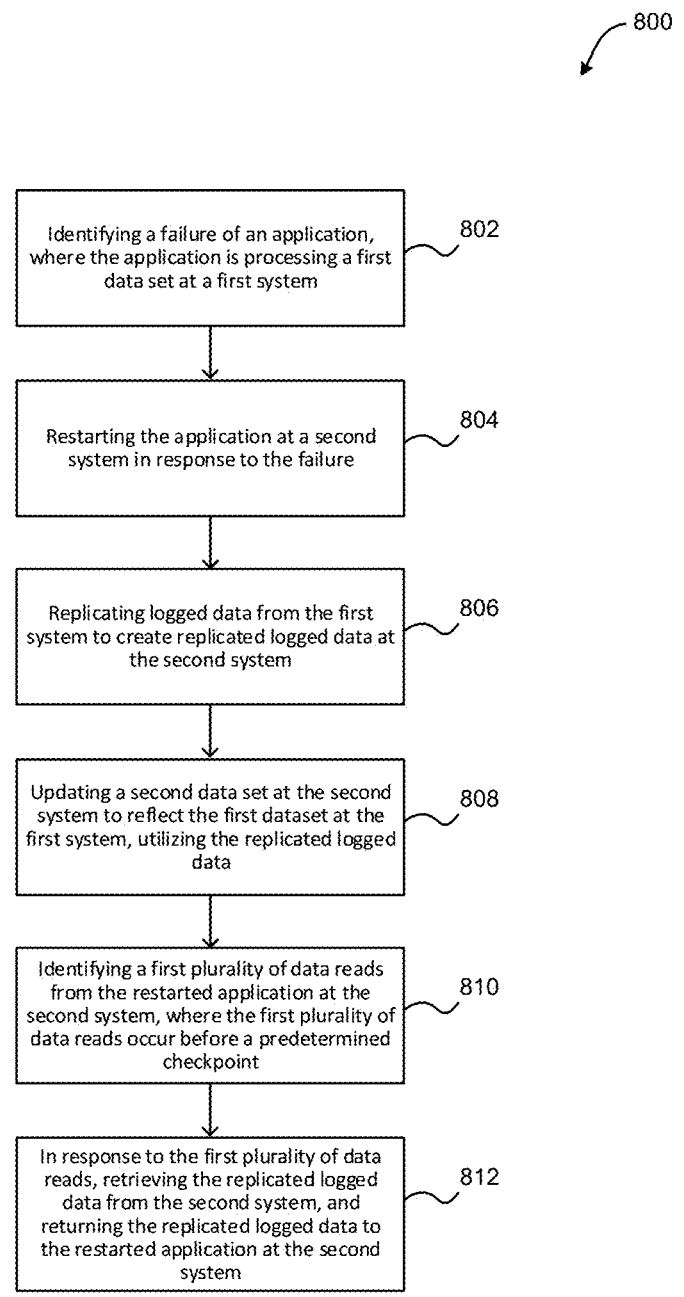
FIG. 8 illustrates a method for restarting an application in a separate system, in accordance with one embodiment.

Now referring to FIG. 8, a flowchart of a method 800 for restarting an application in a separate system is shown according to one embodiment. The method 800 may be performed in accordance with the present invention in any of the environments depicted in FIGS. 2 and 9-11, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a failure of an application is identified, where the application is processing a first data set at a first system. Additionally, method 800 may proceed with operation 804, where the application is restarted at a second system in response to the failure. Further, method 800 may proceed with operation 806, where logged data from the first system is replicated to create replicated logged data at the second system.

Further still, method 800 may proceed with operation 808, where a second data set is updated at the second system to reflect the first data set at the first system, utilizing the replicated logged data. Also, method 800 may proceed with operation 810, where a first plurality of data reads that occur before a predetermined checkpoint are identified from the restarted application at the second system. In addition, method 800 may proceed with operation 812, where in response to the first plurality of data reads, the replicated logged data is retrieved from the second system, and the replicated logged data is returned to the restarted application at the second system.

Figure 9:
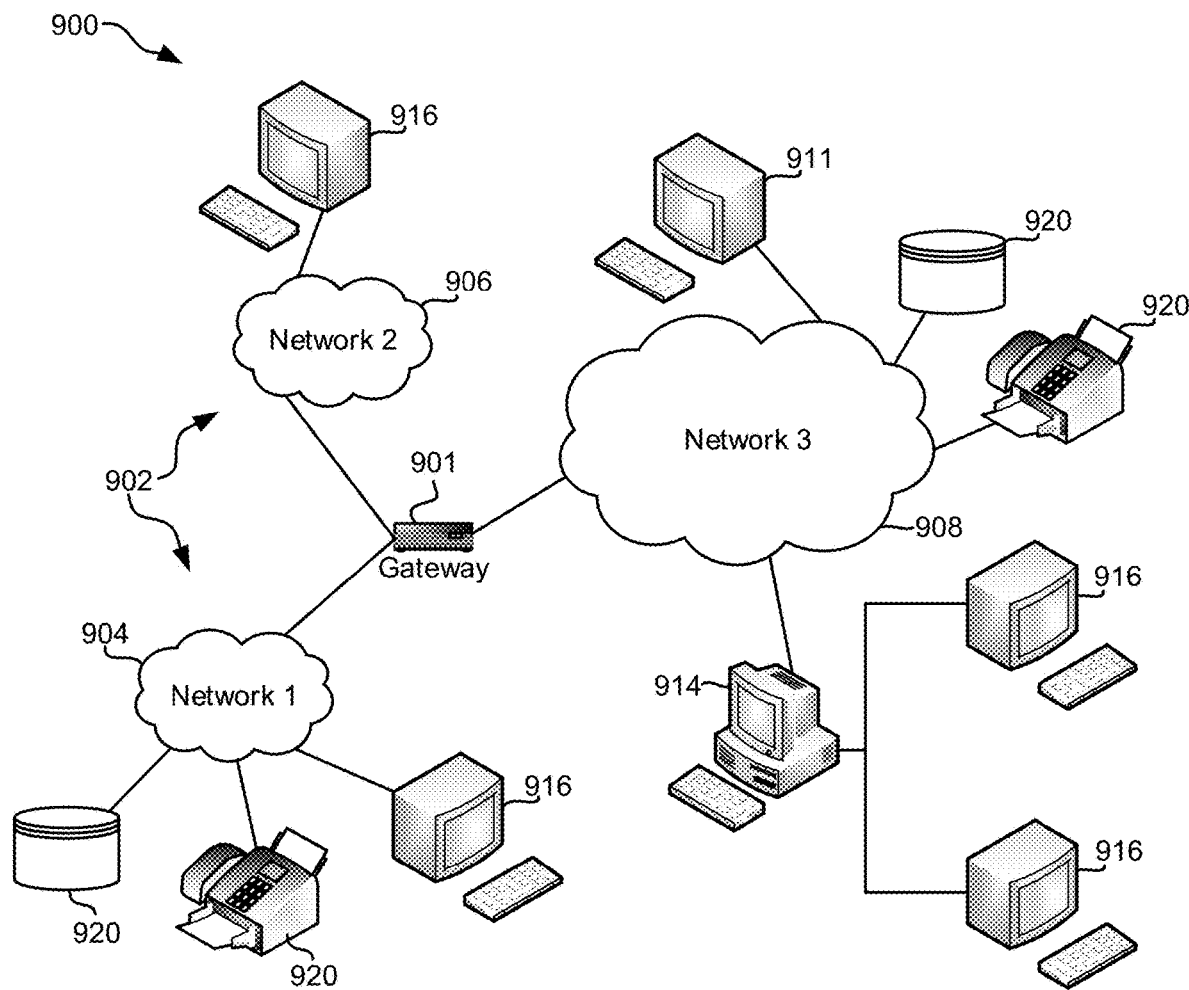
FIG. 9 illustrates a network architecture, in accordance with one embodiment.

FIG. 9 illustrates an architecture 900, in accordance with one embodiment. As shown in FIG. 9, a plurality of remote networks 902 are provided including a first remote network 904 and a second remote network 906. A gateway 901 may be coupled between the remote networks 902 and a proximate network 908. In the context of the present architecture 900, the networks 904, 906 may each take any form including, but not limited to a LAN, a WAN such as the Internet, public switched telephone network (PSTN), internal telephone network, etc.

In use, the gateway 901 serves as an entrance point from the remote networks 902 to the proximate network 908. As such, the gateway 901 may function as a router, which is capable of directing a given packet of data that arrives at the gateway 901, and a switch, which furnishes the actual path in and out of the gateway 901 for a given packet.

Further included is at least one data server 914 coupled to the proximate network 908, and which is accessible from the remote networks 902 via the gateway 901. It should be noted that the data server(s) 914 may include any type of computing device/groupware. Coupled to each data server 914 is a plurality of user devices 916. User devices 916 may also be connected directly through one of the networks 904, 906, 908. Such user devices 916 may include a desktop computer, lap-top computer, hand-held computer, printer or any other type of logic. It should be noted that a user device 911 may also be directly coupled to any of the networks, in one embodiment.

A peripheral 920 or series of peripherals 920, e.g., facsimile machines, printers, networked and/or local storage units or systems, etc., may be coupled to one or more of the networks 904, 906, 908. It should be noted that databases and/or additional components may be utilized with, or integrated into, any type of network element coupled to the networks 904, 906, 908. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 904, 906, 908, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 10:
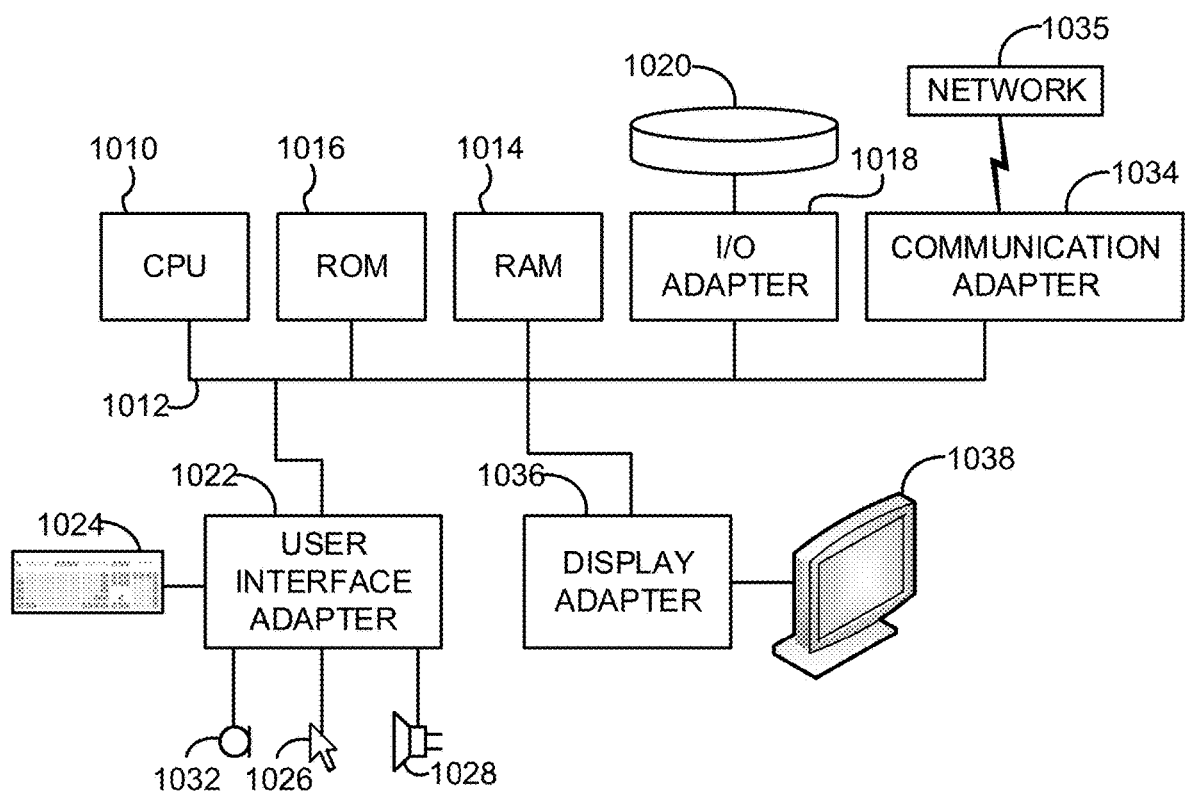
FIG. 10 shows a representative hardware environment that may be associated with the servers and/or clients of FIG. 9, in accordance with one embodiment.

FIG. 10 shows a representative hardware environment associated with a user device 916 and/or server 914 of FIG. 9, in accordance with one embodiment. Such figure illustrates a typical hardware configuration of a workstation having a central processing unit 1010, such as a microprocessor, and a number of other units interconnected via a system bus 1012.

The workstation shown in FIG. 10 includes a Random Access Memory (RAM) 1014, Read Only Memory (ROM) 1016, an I/O adapter 1018 for connecting peripheral devices such as disk storage units 1020 to the bus 1012, a user interface adapter 1022 for connecting a keyboard 1024, a mouse 1026, a speaker 1028, a microphone 1032, and/or other user interface devices such as a touch screen and a digital camera (not shown) to the bus 1012, communication adapter 1034 for connecting the workstation to a communication network 1035 (e.g., a data processing network) and a display adapter 1036 for connecting the bus 1012 to a display device 1038.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 11:
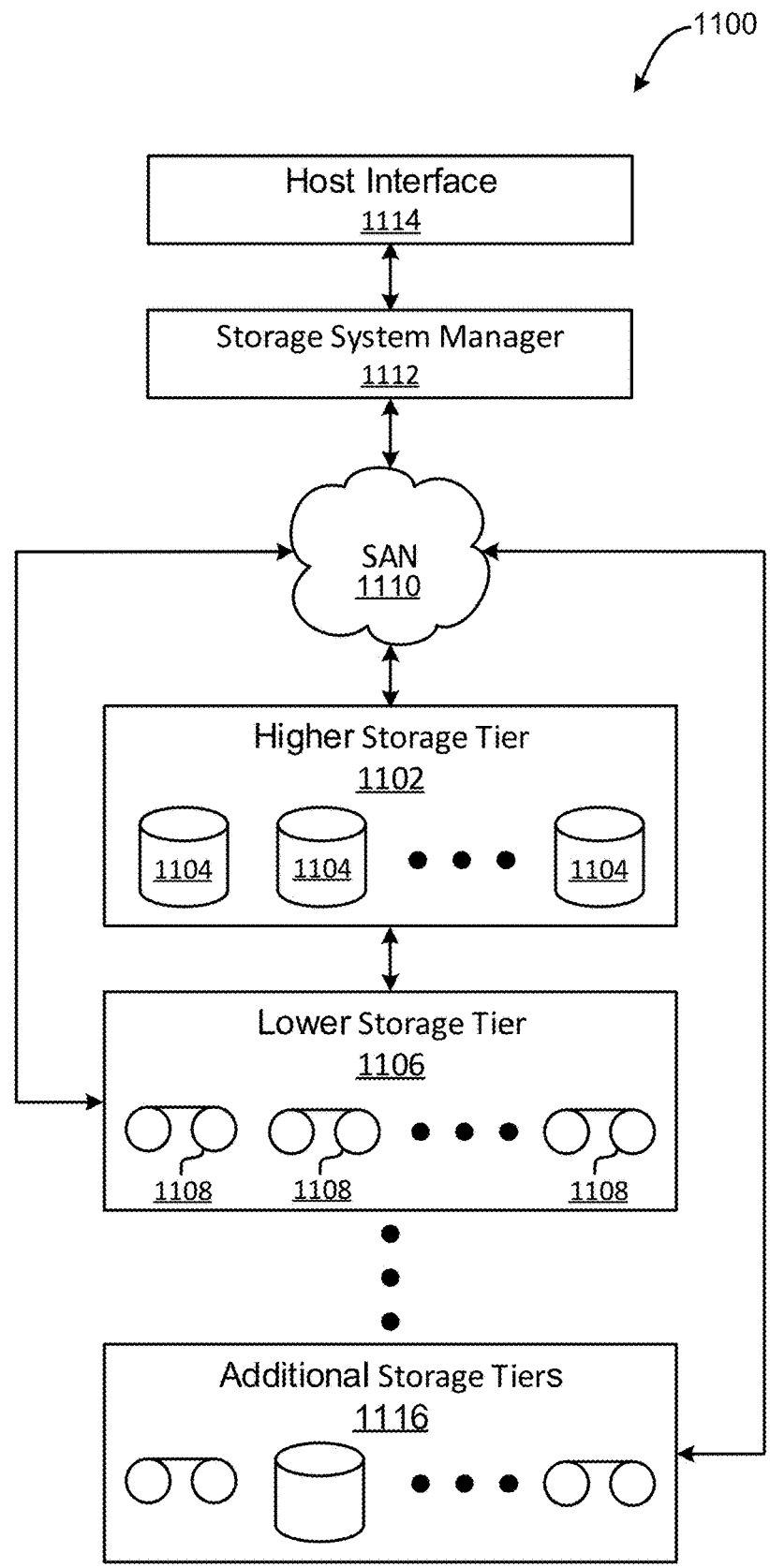
FIG. 11 illustrates a tiered data storage system in accordance with one embodiment.

Now referring to FIG. 11, a storage system 1100 is shown according to one embodiment. Note that some of the elements shown in FIG. 11 may be implemented as hardware and/or software, according to various embodiments. The storage system 1100 may include a storage system manager 1112 for communicating with a plurality of media on at least one higher storage tier 1102 and at least one lower storage tier 1106. The higher storage tier(s) 1102 preferably may include one or more random access and/or direct access media 1104, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1106 may preferably include one or more lower performing storage media 1108, including sequential access media such as magnetic tape in tape drives and/or optical media, slower accessing HDDs, slower accessing SSDs, etc., and/or others noted herein or known in the art. One or more additional storage tiers 1116 may include any combination of storage memory media as desired by a designer of the system 1100. Also, any of the higher storage tiers 1102 and/or the lower storage tiers 1106 may include some combination of storage devices and/or storage media.

The storage system manager 1112 may communicate with the storage media 1104, 1108 on the higher storage tier(s) 1102 and lower storage tier(s) 1106 through a network 1110, such as a storage area network (SAN), as shown in FIG. 11, or some other suitable network type. The storage system manager 1112 may also communicate with one or more host systems (not shown) through a host interface 1114, which may or may not be a part of the storage system manager 1112. The storage system manager 1112 and/or any other component of the storage system 1100 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1100 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1102, may include a majority of SSD storage media for storing data in a higher performing storage environment, and remaining storage tiers, including lower storage tier 1106 and additional storage tiers 1116 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1102, while data not having one of these attributes may be stored to the additional storage tiers 1116, including lower storage tier 1106. Of course, one of skill in the art, upon reading the present descriptions, may devise many other combinations of storage media types to implement into different storage schemes, according to the embodiments presented herein.

According to some embodiments, the storage system (such as 1100) may include logic configured to receive a request to open a data set, logic configured to determine if the requested data set is stored to a lower storage tier 1106 of a tiered data storage system 1100 in multiple associated portions, logic configured to move each associated portion of the requested data set to a higher storage tier 1102 of the tiered data storage system 1100, and logic configured to assemble the requested data set on the higher storage tier 1102 of the tiered data storage system 1100 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   establishing a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint;
   identifying a first failure of the application; and
   restarting the application and performing a first replay of the application in response to the first failure, including:
   identifying a first plurality of data reads from the restarted application that occur before the predetermined checkpoint,
   returning the duplicate read data to the restarted application, in response to the first plurality of data reads,
   identifying a first plurality of data writes from the application, where the first plurality of data writes include writes made by the application before the predetermined checkpoint,
   discarding the first plurality of data writes by writing the first plurality of data writes to a null device,
   identifying a second plurality of data reads from the restarted application that occur after the predetermined checkpoint but before the first failure of the application, where the second plurality of data reads have been undone after the first failure of the application,
   retrieving data from the at least one data set in response to the second plurality of data reads,
   returning the data from the at least one data set to the restarted application, in response to the second plurality of data reads,
   identifying a second plurality of data writes from the restarted application, where the second plurality of data writes are associated with the data from the at least one data set, and
   writing the second plurality of data writes to the at least one data set.

2. The computer-implemented method of claim 1, wherein the application holds a lock on a portion of the at least one data set during the processing of the portion of the at least one data set.

3. The computer-implemented method of claim 2, wherein during the processing of the portion of the at least one data set, the duplicate read data includes an image of all data retrieved from the at least one data set by the application, where the duplicate read data is stored in a log.

4. The computer-implemented method of claim 1, further comprising identifying a second failure of the application during the first replay.

5. The computer-implemented method of claim 4, further comprising restarting the application and performing a second replay of the application.

6. The computer-implemented method of claim 5, wherein the second failure of the application results in stale read data within the log.

7. The computer-implemented method of claim 6, further comprising skipping over the stale read data, utilizing a filter.

8. A computer program product for enabling a replay of a processing of at least one data set by a restarted application, the computer program product comprising a computer readable storage medium having program instructions embodied therewith, wherein the computer readable storage medium is not a transitory signal per se, the program instructions executable by a processor to cause the processor to perform a method comprising:
  establishing, by the processor, a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint;
  identifying, by the processor, a first failure of the application; and
  restarting, by the processor, the application and performing a first replay of the application in response to the first failure, including:
  identifying, by the processor, a first plurality of data reads from the restarted application that occur before the predetermined checkpoint,
  returning, by the processor, the duplicate read data to the restarted application, in response to the first plurality of data reads,
  identifying, by the processor, a first plurality of data writes from the application, where the first plurality of data writes include writes made by the application before the predetermined checkpoint,
  discarding, by the processor, the first plurality of data writes by writing the first plurality of data writes to a null device,
  identifying, by the processor, a second plurality of data reads from the restarted application that occur after the predetermined checkpoint but before the first failure of the application, where the second plurality of data reads have been undone after the first failure of the application,
  retrieving, by the processor, data from the at least one data set in response to the second plurality of data reads,
  returning, by the processor, the data from the at least one data set to the restarted application, in response to the second plurality of data reads,
  identifying, by the processor, a second plurality of data writes from the restarted application, where the second plurality of data writes are associated with the data from the at least one data set, and
  writing, by the processor, the second plurality of data writes to the at least one data set.

9. The computer program product of claim 8, wherein the application holds a lock on a portion of the at least one data set during the processing of the portion of the at least one data set, utilizing the processor.

10. The computer program product of claim 9, wherein during the processing of the portion of the at least one data set, the duplicate read data includes an image of all data retrieved from the at least one data set by the application, where the duplicate read data is stored in a log, utilizing the processor.

11. The computer program product of claim 8, further comprising identifying a second failure of the application during the first replay, utilizing the processor.

12. The computer program product of claim 11, further comprising restarting the application and performing a second replay of the application, utilizing the processor.

13. The computer program product of claim 12, wherein the second failure of the application results in stale read data within the log.

14. The computer program product of claim 13, further comprising skipping over the stale read data, utilizing a filter and the processor.

15. A system, comprising:
  a processor; and
  logic integrated with the processor, executable by the processor, or integrated with and executable by the processor, the logic being configured to:
  establish a predetermined checkpoint and storing a log of duplicate read data in association with the predetermined checkpoint during a running of an application that is processing at least one data set, the duplicate read data including an image of all data retrieved from the at least one data set in response to a plurality of data reads made by the application before the predetermined checkpoint;
  identify a first failure of the application; and
  restart the application and performing a first replay of the application in response to the first failure, including:
  identify a first plurality of data reads from the restarted application that occur before the predetermined checkpoint,
  return the duplicate read data to the restarted application, in response to the first plurality of data reads,
  identify a first plurality of data writes from the application, where the first plurality of data writes include writes made by the application before the predetermined checkpoint,
  discard the first plurality of data writes by writing the first plurality of data writes to a null device,
  identify a second plurality of data reads from the restarted application that occur after the predetermined checkpoint but before the first failure of the application, where the second plurality of data reads have been undone after the first failure of the application,
  retrieve data from the at least one data set in response to the second plurality of data reads,
  return the data from the at least one data set to the restarted application, in response to the second plurality of data reads, identify a second plurality of data writes from the restarted application, where the second plurality of data writes are associated with the data from the at least one data set, and write the second plurality of data writes to the at least one data set.

16. The system of claim 15, wherein the application holds a lock on a portion of the at least one data set during the processing of the portion of the at least one data set.

17. The system of claim 16, wherein during the processing of the portion of the at least one data set, the duplicate read data includes an image of all data retrieved from the at least one data set by the application, where the duplicate read data is stored in a log.

18. The system of claim 17, wherein the logic is further configured to identify a second failure of the application during the first replay.

19. The system of claim 18, wherein the logic is further configured to restart the application and performing a second replay of the application.

20. The system of claim 19, wherein the second failure of the application results in stale read data within the log.

\* \* \* \* \*